(12) United States Patent
Yoshida et al.

(10) Patent No.: US 6,814,380 B2
(45) Date of Patent: Nov. 9, 2004

(54) BUMPER REINFORCEMENT

(75) Inventors: Hiroshi Yoshida, Soja (JP); Koji Shimotsu, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 10/437,493

(22) Filed: May 14, 2003

(65) Prior Publication Data

US 2003/0227182 A1 Dec. 11, 2003

(30) Foreign Application Priority Data

Jun. 7, 2002 (JP) ........................................ 2002-167460

(51) Int. Cl.$^7$ ............................................. B60R 19/04
(52) U.S. Cl. ........................................................ 293/120
(58) Field of Search ............................... 293/120, 121, 293/122, 130, 102

(56) References Cited

U.S. PATENT DOCUMENTS

| | | | |
|---|---|---|---|
| 3,897,095 A | * | 7/1975 | Glance et al. ............... 293/120 |
| 4,088,357 A | * | 5/1978 | Klie et al. ................... 293/122 |
| 4,492,398 A | | 1/1985 | Peter |
| 4,998,761 A | | 3/1991 | Bayer et al. |
| 5,080,411 A | | 1/1992 | Stewart et al. |
| 5,780,129 A | * | 7/1998 | Ohta .......................... 293/120 |
| 6,474,708 B1 | | 11/2002 | Gehringhoff et al. |
| 6,669,252 B2 | * | 12/2003 | Roussel et al. ............. 293/120 |

FOREIGN PATENT DOCUMENTS

| | | |
|---|---|---|
| DE | 199 12 272 | 9/2000 |
| JP | 09-095189 | 4/1997 |
| JP | 2554459 | 7/1997 |
| JP | 2000-334530 | 12/2000 |
| JP | 2001-199292 | 7/2001 |
| JP | 2001-227573 | 8/2001 |
| JP | 2001-260773 | 9/2001 |

* cited by examiner

*Primary Examiner*—Jason Morrow
(74) *Attorney, Agent, or Firm*—Koda & Androlia

(57) ABSTRACT

A bumper reinforcement comprises an outer reinforcement and an inner reinforcement wherein the outer reinforcement of an open section is formed by a front face, an upper face, and a lower face; and the inner reinforcement housed in the outer reinforcement is formed symmetrically from the center in vertical direction by a intermediate portion formed by edge portions of inner skirt plate portions confronting each other, the inner skirt plate portion, a top portion, an outer skirt plate portion, and an outer contact face portion. The outer reinforcement comprises a concave groove portion in the front face, and a pair of ribs in the upper/lower face. Accordingly, the bumper reinforcement of the invention has achieved high rigidity against the impact applied and easy manufacturing with high cost performance and capability of various designing of the vehicles.

6 Claims, 17 Drawing Sheets

BUMPER REINFORCEMENT

BACKGROUND OF THE INVENTION

1. Field of the Invention

The present invention relates to a bumper reinforcement having an open section structure including a front face, an upper face and a lower face.

2. Description of the Related Art

A bumper belonging to the safety parts of an automobile is constructed by a bumper reinforcement as a strength member and a bumper cover as a decoration member. The bumper reinforcement can be divided into one having a closed section structure and another having an open section structure. The bumper reinforcement having the closed section structure is disclosed in JP-A-2000-334530, JP-A-2001-199292, JP-A2001-260773, JP-A-2001-227573, U.S. Pat. No. 5,080,411 and so on. On the other hand, the bumper reinforcement having the open section structure is disclosed in JP-A-09-095189, U.S. Pat. No. 4,492,398, U.S. Pat. No. 4,998,761 and so on.

The bumper reinforcement having the closed section structure is advantageous as the strength member. On the other hand, the bumper reinforcement having the open section structure is advantageous to be manufactured easier with high cost performance. In order to incorporate the superior points of these structures into each other, therefore, improvements have been proposed by attaching an auxiliary reinforcement (e.g., a cover having abridging structure in which leg portions are fixed on an upper face and a lower face and which is spaced from a front face) to the front face of the bumper reinforcement, and shown in Japanese Utility Model Registration No. 2554459, USP No. 2002/0047281, DE199 12 272 A1, JP-A-09-095189, U.S. Pat. No. 4,492, 398, U.S. Pat. No. 4,998,761 and so on.

The reason why the bumper reinforcement having the open section structure is inferior in the structural strength is caused by the fact that when the front face of the bumper reinforcement receives an impact, the upper face and the lower face of the bumper reinforcement are vertically opened about their boundaries of the front face thereby to lower the modulus of section of the bumper reinforcement. When the upper face and the lower face of the bumper reinforcement are opened, more specifically, the capacity for absorbing the impact energy is reduced to lower the shock absorbing performance as the bumper reinforcement.

In order that the bumper reinforcement having the open section structure may be worth to high structural strength and shock absorbing performance of the bumper reinforcement having the closed section structure, it is then sufficient to prevent the upper face and the lower face of the bumper reinforcement from being opened when the bumper reinforcement receives an impact. Therefore, investigations have been made to develop a bumper reinforcement having the open section structure, which is enabled to exhibit such high structural strength and shock absorbing performance by preventing the upper face and the lower face of the bumper reinforcement from being opened as are not inferior to the bumper reinforcement having the closed section structure.

Here is a case in which a concave groove is formed in the front face of the bumper reinforcement so as to reinforce the bumper reinforcement. With the concave groove being merely formed, however, the rigidities of the upper face and the lower face of the bumper reinforcement are inferior to that of the front face so that the upper face or the lower face of the bumper reinforcement is easily made to buckle by the impact applied on the front face. This buckling can be avoided by increasing the thickness of the upper face or the lower face. At the same time, however, there are lost the advantages of the light weight and the reduction of the material which are owned by the bumper reinforcement having the open section structure. Therefore, the inventors of the invention have investigated to develop the bumper reinforcement having the open section structure, which is enabled to exhibit the aforementioned high structural strength and shock absorbing performance more sufficiently by preventing the buckling of the upper face and the lower face of the bumper reinforcement.

SUMMARY OF THE INVENTION

First of all, with a view to preventing the upper face and the lower face of the bumper reinforcement from being opened, the present invention has developed a bumper reinforcement comprising an outer reinforcement and an inner reinforcement housed in the outer reinforcement. The outer reinforcement is made of a channel member of an open section having a front face, an upper face and a lower face, and the inner reinforcement is made of an angle member having a vertically pair of skirt plate portions folded from an intermediate portion. And, the intermediate portion of the inner reinforcement is joined to the front face of the outer reinforcement. The upper skirt plate portions of the inner reinforcement are joined at their end portions to the upper face of the outer reinforcement, and the lower skirt plate portions are joined at their end portions to the lower face of the outer reinforcement.

The following examples can be enumerated as the preferable sectional shapes of an inner reinforcement. At the individual skirt plate portions of the inner reinforcement, more specifically, there are formed the top portions which are protruded toward the front face of the outer reinforcement to divide the upper and lower skirt plate portions are further divided into the inner skirt plate portions and the outer skirt plate portions. Then, the intermediate portion of the inner reinforcement corresponds to the portion composed of the confronting end portions of the inner skirt plate portions, and the remaining end portions of the individual inner skirt plate portions protrude as the top portions formed with the end portions of the outer skirt plate portions, toward the front face of the outer reinforcement. The outer contact face portion of the inner reinforcement, that is the remaining end portion of the aforementioned outer skirt plate portion, is joined individually to the upper face and the lower face of the outer reinforcement thereby to follow the sectional shape of the inner reinforcement.

The outer reinforcement is usually formed from a single metal plate by a roll-forming method. Unlike the auxiliary reinforcement attached to the front face of the outer reinforcement, the inner reinforcement is mounted in an inside of the outer reinforcement formed by the front face, the upper face and the lower face. The inner reinforcement can be classified into a separate type, in which the inner reinforcement divided into a pair of the vertically symmetrical members is individually provided with the inside of the front face, and the upper/lower faces of the outer reinforcement, and a single formed type, in which the inner reinforcement is integrally formed to be provided continuously with the inside of the lower face, the front face, and the upper face of the outer reinforcement.

The inner reinforcement of either type has a common structure, in which the outer contact face portions are directly joined to the upper/lower faces of the outer reinforcement through the intermediate portion joined to the front face of the outer reinforcement. When an impact applied to the front face of the outer reinforcement, therefore, the end portions of the individual skirt plate portions forming the intermediate portion of the inner reinforcement joined to the front face of the outer reinforcement, and the end portions of the skirt plate portions of the inner reinforcement forming the outer contact face portions joined individually to the upper/lower faces of the outer reinforcement, are retracted relative to the intermediate portion of the skirt plate portion so that the skirt plates are folded around the center portions of the skirt plate portions. This folding structure inclines the entire skirt plate portions inwardly when an impact applied, so that the upper face and the lower face of the outer reinforcement can be prevented from being opened.

The intermediate portions of the individual skirt plate portions of the inner reinforcement are the top portions which are formed at the boundary between the inner skirt plate portions and the outer skirt plate portions and which are protruded toward the front face of the outer reinforcement. In this case, when an impact applied to the front face of the outer reinforcement, the end portions of the upper and the lower inner skirt plate portions joined to the front face and the other end portions of the upper and the lower outer skirt plate portions joined to the upper/lower faces of the outer reinforcement individually are retracted from the top portions so that the inner skirt plate portions and the outer skirt plate portions are folded around the top portions thereby to incline the entire skirt plate portions inward. As a result, it prevents the upper face and the lower face of the outer reinforcement from being opened.

The outer reinforcement has to retain the space at its inside for allowing the top portions of the inner reinforcement to protrude. In case the front face of the outer reinforcement is flat, therefore, the intermediate portion of the inner reinforcement is protruded toward and joined to the front face of the outer reinforcement. In case the impact is applied from the front to the reinforcement having that structure, however, the top portions may obstruct such a displacement of the skirt plate portions, as follows the displacement of the front face of the outer reinforcement. Therefore, it is advisable to form the concave groove portion extending in the extending direction of the outer reinforcement, in the front face of the outer reinforcement. It is also advisable to join the intermediate portion of the inner reinforcement to the concave groove portion of the outer reinforcement and the outer contact face portions of the inner reinforcement individually to the upper face and the lower face of the outer reinforcement. It is preferable that the outer reinforcement has the concave groove portion formed in the front face and extending in the extending direction of the outer reinforcement, that the intermediate portion of the inner reinforcement is joined in face-to-face contact to the bottom face of the concave groove portion, and that the outer contact face portions of the inner reinforcement are joined individually to the upper face and the lower face of the outer reinforcement.

When the bottom face of the concave groove portion of the outer reinforcement is positioned backward to an extent corresponding to the protrusion of the top portions of the inner reinforcement with respect to the front face, the skirt plate portions of the inner reinforcement or the end portions of the inner skirt plate portions can be joined as they are to the bottom face or the side faces of the groove portion of the outer reinforcement. In case the impact is applied to the reinforcement, therefore, the top portions of the inner reinforcement does not obstruct the displacement of the skirt plate portions, as follows the displacement of the front face of the outer reinforcement. Moreover, the concave groove portion of the outer reinforcement enhances the rigidity of the front face to restrain even the partial deformation occurred. In case the bumper reinforcement receives a partial impact, as exemplified by a pole collision or the like, the front face is deformed over a wide range in the extending direction of the outer reinforcement, thereby to prevent the partial deformation of the front face, that is, to prevent the deterioration of the shock absorbing performance of the bumper reinforcement due to the buckling.

In order to guide the folding of the inner skirt plate portions and the outer skirt plate portions of the inner reinforcement in case the concave groove portion is formed in the outer reinforcement, it is advisable to make the inner skirt plates shorter, or the outer skirt plates longer, thereby to bring the rising angle of the inner skirt plates from the end portions to the top portions of the skirt plate portions of the inner reinforcement, closer to the inclination angle of the side faces of the concave groove portion of the outer reinforcement.

The inner skirt plate portions and the outer skirt plate portions of the inner reinforcement are folded by retracting the end portions of the inner skirt plates and the outer skirt plates from the top portions, as has been described hereinbefore. If the top portions of the inner reinforcement are positioned far from the side faces of the concave groove portion of the outer reinforcement, the inner skirt plate portions of the inner reinforcement become reluctant to receive the influences of the retractions of the concave groove portion of the outer reinforcement. As a result, the moment of the outer skirt plate portions of the inner reinforcement to be inclined inward is reduced the actions to restrain the openings of the upper face and the lower face of the outer reinforcement. It is, therefore, desirable that the top portions of the inner reinforcement are positioned as close to the side faces of the concave groove portion as possible.

In the same time, the inner skirt plate portions of the inner reinforcement are closer to the side faces but not in close contact with the side faces of the concave groove portion of the outer reinforcement. It is advisable that the rising angle of the inner skirt plate portions of the inner reinforcement from the end portions joined to the bottom face of the concave groove portion of the outer reinforcement is close to the inclination angle of the side faces of the concave groove portion of the outer reinforcement. That is, provided an open angle relation of the inner skirt plate portions against the side faces. It is advisable that a specific rising angle of the inner skirt plate portions forms a space for allowing the inclination of the inner skirt plate portions with respect to the side faces of the concave groove portion of the outer reinforcement when the inner skirt plate portions and the outer skirt plate portions are folded from the top portions. The space between the inner skirt plate portions of the inner reinforcement and the side faces of the concave groove portion of the outer reinforcement provides an inclination margin for the inner skirt plate portions of the inner reinforcement thereby to allow the inclination of the inner skirt plates.

The inner reinforcement may be of the separate type, as described hereinbefore. However, this construction raises the problems: an increase in the number of parts; the difficulty for positioning the inner reinforcement when joined to the outer reinforcement; and the vertically uneven retractions, as received by the upper and lower inner reinforcements, of the front face or the concave groove portion of the outer reinforcement. With a view to restraining the increase in the parts number or receiving the retraction of the front face or the concave groove portion of the outer reinforcement vertically equally, therefore, the construction is made such that the inner reinforcement is a single formed member having the intermediate portion and such that the bottom face of the concave groove portion of the outer reinforcement and the intermediate portion of the inner reinforcement are joined in face-to-face contact to each other.

Here, it is desirable that the individual top portions are formed at vertically symmetric positions so that the upper and lower inner skirt plate portions and the upper and lower outer skirt plate portions of the inner reinforcement may be likewise folded vertically homogeneously by the retraction of the concave groove portion of the outer reinforcement. In order to receive the influences of the retraction of the concave groove portion of the outer reinforcement sufficiently, moreover, it is preferable, in this integral type inner reinforcement, to make the inner skirt plates shorter, or the outer skirt plates longer, thereby to bring the rising angle of the inner skirt plates from the end portions to the top portions of the skirt plate portions of the inner reinforcement, closer to the inclination angle of the side faces of the concave groove portion of the outer reinforcement. At this time, the inner skirt plate portions of the inner reinforcement are closer to the side faces but not in close contact with the side faces of the concave groove portion of the outer reinforcement.

In order to prevent the buckling of the upper face or the lower face of the outer reinforcement, the concave groove portion extending in the extending direction of the outer reinforcement is formed in the front face, and ribs extending in the extending direction of the outer reinforcement are also formed individually in the upper face and the lower face. As a result, the upper face and the lower face of the outer reinforcement can be parted by the ribs into the front side face portions and the rear side face portions. By installing the outer contact face portions of the inner reinforcement to the individual ribs of the outer reinforcement, the outer contacting face portions are joined to the upper face and the lower face of the outer reinforcement, and the intermediate portion of the inner reinforcement is joined to the front face of the outer reinforcement. Thus, it has solved the problem of the buckling in the upper face or the lower face of the outer reinforcement.

The outer contact face portions of the inner reinforcement may be joined to any of the front side face portions, the ribs, or the rear side face portions in the upper/lower faces of the outer reinforcement. However, the individual join positions are desirably located such that the line connecting the individual join positions is in parallel to the line connecting the two corners formed between the upper/lower faces and the front face.

The ribs have a function to disperse the impact applied to the front face of the outer reinforcement in the extending direction of the ribs, i.e., in the extending direction of the bumper reinforcement, thereby providing the rigidity to the upper/lower faces sufficiently compared to that of the front face having the concave groove portion. As a result, it restrains or prevents the buckling of the upper face and the lower face of the outer reinforcement.

The ribs also have a function to disperse the impact, as transmitted individually to the upper/lower faces of the outer reinforcement, in the extending direction of the outer reinforcement. If the impact dispersing action is effective at different timings on the upper face and the lower face, the load is maldistributed to the face having slower timing, thereby to cause the buckling. Therefore, it becomes the basis that a pair of ribs are provided at identical positions from the corners between the upper/lower faces and the front face thereby to give an equal width to the paired front side face portions of the upper/lower faces of the outer reinforcement.

Here, the phrase "identical positions" means that, in the sectional configuration of the outer reinforcement, the ribs formed individually in the upper face and the lower face are located at the same positions, as taken in the vehicle frame direction, from the corners between the upper/lower faces and the front face of the outer reinforcement. Usually, in the sectional configuration of the outer reinforcement, the upper face and the lower face take the equal lengths in the vehicle frame direction and are parallel. Therefore, the ribs take axially symmetric positions across the center line (usually a bisector of the front face) between the upper face and the lower face so that the paired front side face portions and the paired rear side face portions, as divided by the ribs, of the upper face and the lower face of the outer reinforcement have equal lengths in the depth direction.

By the front side face portions and the rear side face portions classified by the ribs, the upper/lower faces of the outer reinforcement are divided into lengths in the depth direction shorter than the upper/lower faces having no rib, thereby to occur buckling hardly. If the ribs are arranged at deep positions in the depth direction, i.e., at positions close to the back face of the reinforcement, however, the depth of the front side face portions is enlarged to increase the apprehension of the buckling of the front side face portions. On the contrary, if the ribs are arranged at shallow positions in the depth direction, i.e., at positions close to the front face of the reinforcement, the depth of the rear side face portions is enlarged to increase the apprehension of the buckling of the rear side face portions. Therefore, it is advisable that the ribs are formed in one pair on a normal, as passing through the center of gravity of the reinforcement, to the upper face and the lower face. In this case, the individual ribs are positioned on the common normal so that they never fail to take the axial symmetry.

As a result, the front side face portions and the rear side face portions of the upper/lower faces of the outer reinforcement take dynamically equivalent relations (in which the load is applied substantially equivalently) across the normal passing through the center of gravity of the reinforcement. Therefore, it is possible to minimize the apprehension that the load is maldistributed to the front side face portions or the rear side face portions and causes to occur buckling.

The specific shapes of the ribs are exemplified by step portions dividing the front side face portions and the rear side face portions into two steps, or a convex bar or concave groove capable of arranging the front side face portions and the rear side face portions in a common plane. The steps can also be exemplified by steps to make the distance of the paired front side face portions of the upper/lower faces relatively narrower than that of the paired rear side face portions of the upper/lower faces. On the contrary, narrow steps are exemplified to make the distance of the paired front side face portions of the upper/lower faces relatively wider than that of the paired rear side faces portions of the upper/lower faces.

Moreover, the convex bar, as one of the specific shapes of the ribs, is exemplified by a side convex bar having a face wider than those of the front side face portions and the rear side face portions of the upper/lower faces of the outer reinforcement. On the other hand, the concave groove is exemplified by side concave grooves having a face relatively narrower than those of the front side face portions and the rear side face portions of the upper/lower faces of the outer reinforcement.

The side convex bars or the side concave grooves can be obtained by the construction, in which the steps and the narrow steps mentioned above can be formed continuously in a set, so that intermediate face portions are formed between the front side face portions and the rear side face portions formed. As a result, the individual lengths of the front side face portions and the rear side face portions are shortened in the depth direction by the length of the intermediate face portions, thereby to make buckling harder. The front side face portions and the rear side face portions divided by the side convex bars or the side concave grooves may be arranged in a common plane or at two steps shifted.

In addition, the steps, the side convex bars, and the side concave grooves to form the ribs are active to bring the leg portions of the auxiliary reinforcement, as attached to the front face of the outer reinforcement, into abutment against the upper face and the lower face of the outer reinforcement thereby to position the auxiliary reinforcement with respect to the outer reinforcement. Moreover, the steps, the side convex bars, and the side concave grooves to form the ribs are also active to position the inner reinforcement with respect to the outer reinforcement when the outer contact face portions of the inner reinforcement having the top portions are joined to the inner sides of the upper face and the lower face of the outer reinforcement.

DETAILED DESCRIPTION OF THE INVENTION

Embodiments of the invention will be described sequentially in the actions of an inner reinforcement, and the actions of ribs formed at the upper and the lower faces of an outer reinforcement with reference to the accompanying drawings.

Figure 1:
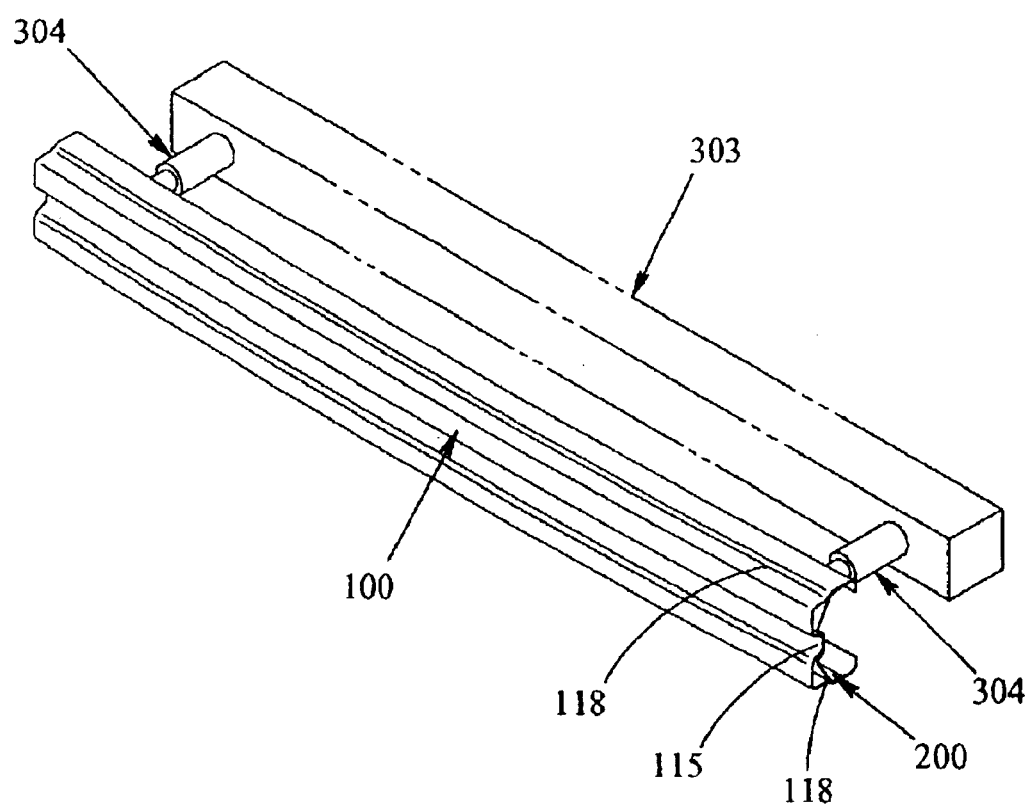
FIG. 1 is a perspective view showing the state, in which a bumper reinforcement according to the invention is used.

A bumper reinforcement having an inner reinforcement 200 housed in an outer reinforcement 100 of an open section structure is supported by bumper supporting members 304, which are protruded forward (or backward) from a vehicle frame member 303, as shown in FIG. 1. The bumper reinforcement is covered on its front face with the (not-shown) bumper decorating member to construct a shock resisting member for an automobile or the like. An auxiliary reinforcement 300 is so suitably attached to a front face 110 of the outer reinforcement 100 as to deal with a local impact such as a pole collision (as referred to phantom lines in FIG. 2).

Figure 2:
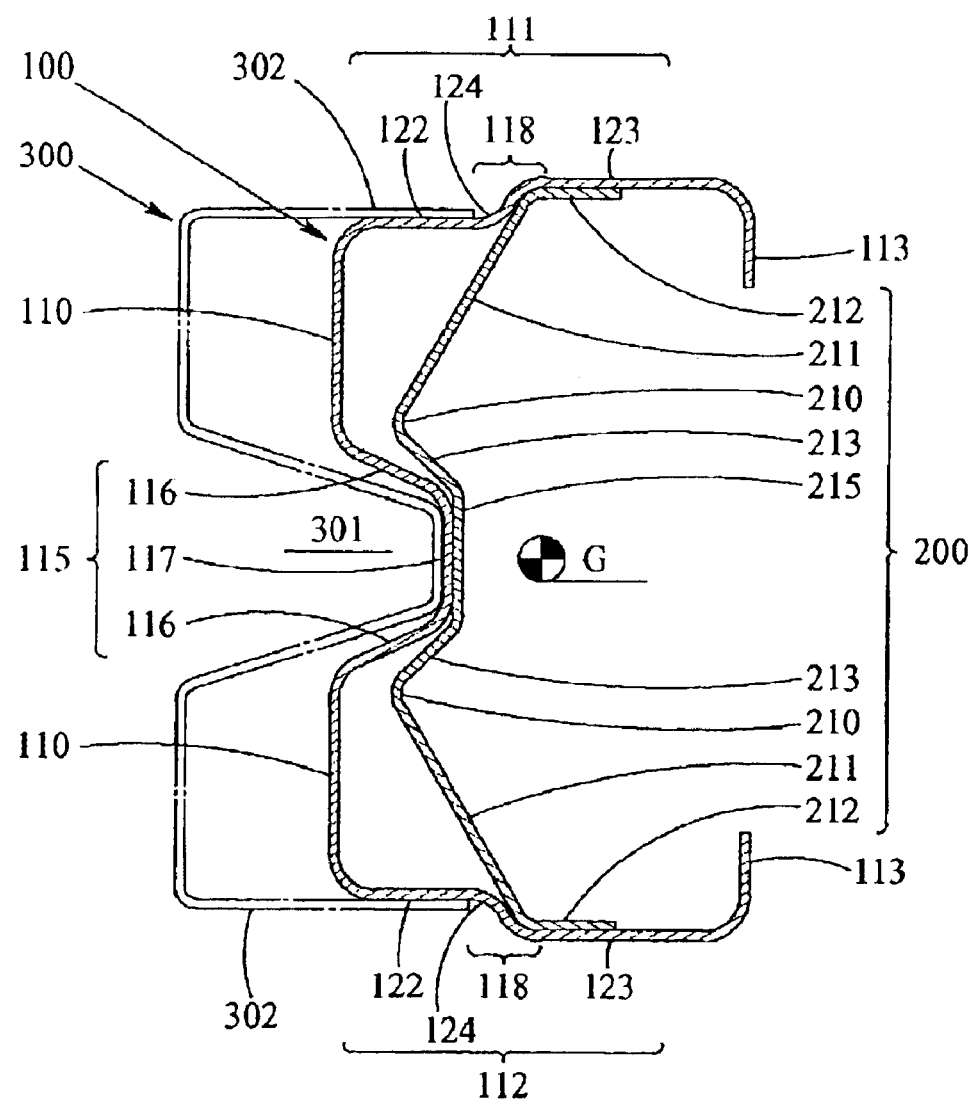
FIG. 2 is a longitudinal section showing the bumper reinforcement, in which a vertically single formed type inner reinforcement is housed in an outer reinforcement having steps and a concave groove portion in a front face.

In this embodiment, as shown in FIG. 2, the bumper reinforcement has an inner reinforcement 200 of a single formed type housed in the outer reinforcement 100 having a concave groove portion 115 in its front face. The outer reinforcement 100 is formed to have the front face 110 having the concave groove portion 115, an upper face 111 and a lower face 112. The concave groove portion 115 comprises a pair of side faces 116 of the concave groove portion and a bottom face 117 of the concave groove portion and is extended in direction of the length of the outer reinforcement 100. The concave groove portion 115 is formed by folding the outer reinforcement 100 continuously from the front face 110.

The concave groove portion 115 has functions: to retain spaces for allowing top portions 210 of the inner reinforcement 200 to protrude at inside of the outer reinforcement 100; to bring a front face of an intermediate portion 215 formed in the inner reinforcement 200 into contact with the bottom face 117 of the concave groove portion 115 thereby to position of inner skirt plate portions 213 of the inner reinforcement 200 with respect to the outer reinforcement 100; to enhance the rigidity of the front face 110; and to position the auxiliary reinforcement 300 with respect to the outer reinforcement 100 by having its concave section portion 301 in abutment against the outer reinforcement 100.

Step portions 118 formed at the upper face 111 and the lower face 112 have functions to enhance the rigidities of the upper face 111 and the lower face 112, and to position outer skirt plate portions 211 of the inner reinforcement 200 with respect to the outer reinforcement 100 by being applied to outer contact face portions 212 of the inner reinforcement 200 to contact with the upper face 111 and the lower face 112.

Figure 3:
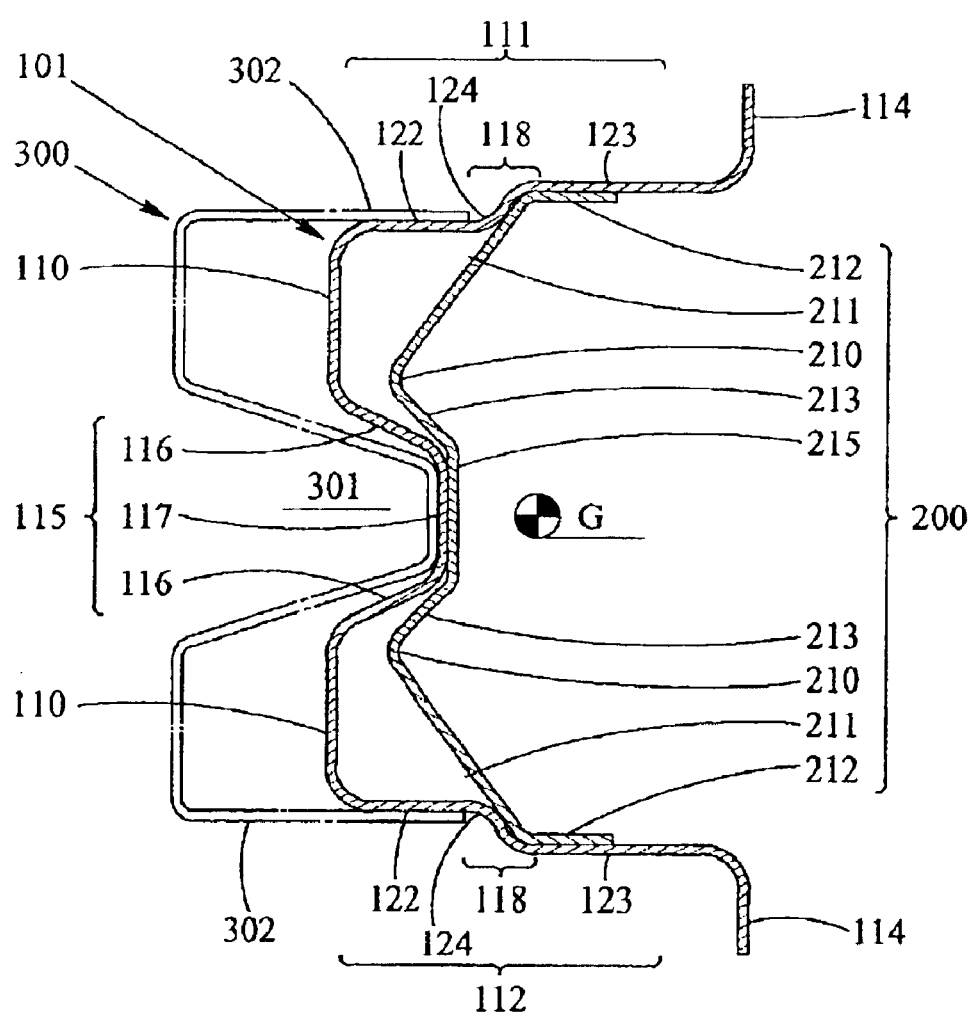
FIG. 3 is a longitudinal section similar to FIG. 2 but shows a bumper reinforcement, in which vertically paired short rib faces are formed by folding the upper face and the lower face outward.

The upper face 111 and the lower face 112 of this embodiment are folded inward at their end edges extending therefrom to form vertically paired short rib faces 113, so as to retain their rigidities at their end edges. As shown in FIG. 3, the bumper reinforcement can also be constructed by mounting the inner reinforcement 200 in an outer reinforcement 101, in which rib faces 114 are formed by extending the rear end edges of the upper face 111 and the lower face 112 and by folding the same outward.

Figure 4:
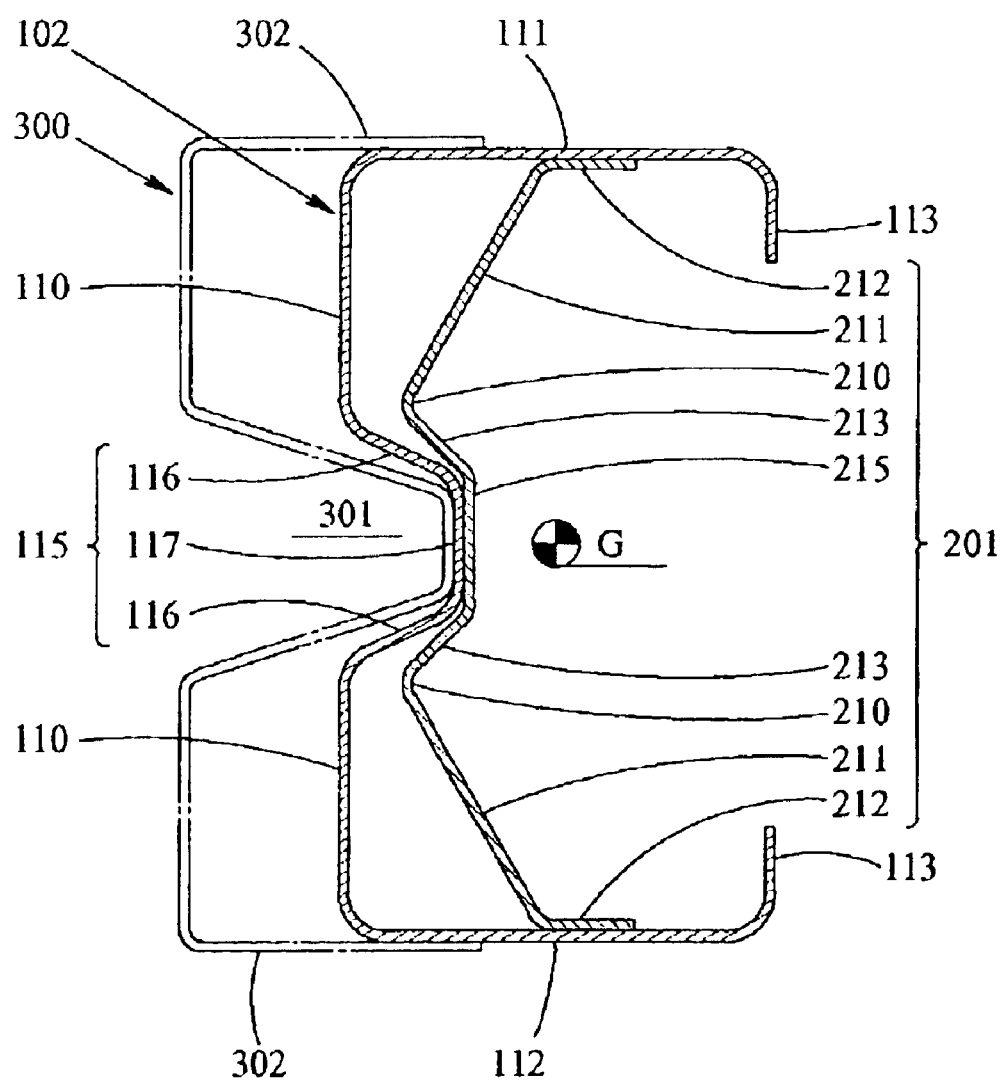
FIG. 4 is a longitudinal section similar to FIG. 2 but shows a bumper reinforcement, in which a vertically integral inner reinforcement is housed in an outer reinforcement having only a concave groove portion in a front face.

On the other hand, as shown in FIG. 4, an inner reinforcement 201 can also be housed in an outer reinforcement 102 having a flat upper face 111 and a flat lower face 112 (having no rib).

The inner reinforcement 200 is integrally formed by folding to arrange symmetrically the inner skirt plate portions 213, the top portions 210, and the outer skirt plate portions 211 vertically around the intermediate portion 215 to be joined to the concave groove portion 115. The inner reinforcement 200 is joined at its intermediate portion 215 to make face-to-face contact with the bottom face 117 of the concave groove portion 115. The opening angles of the inner skirt plate portions 213 relative to the intermediate portion 215 are made so larger than that (at which the concave groove bottom face 117 and the concave groove side faces 116 intersect) of the side faces 116 relative to the bottom face 117 as to prepare an allowance of inclination toward the side faces 116 of the concave groove portion 115. On the other hand, the outer skirt plate portions 211 are fixed by joining their outer contact face portions 212, which are folded in parallel with the upper face 111 and the lower face 112, to the inner sides of the upper face 111 and the lower face 112 by applying the outer contact faces 212 to the steps 118 which are formed at the upper face 111 and the lower face 112.

The angles of the top portions 210 each formed between the inner skirt plate portion 213 and the outer skirt plate portion 211 are set less than 180 degrees or preferably at or smaller than 90 degrees because the inner skirt plate portion 213 and the outer skirt plate portion 211 have to be folded. The lower limit of the angle of the top portion 210 is not specifically limited. As the angle becomes the smaller, however, the top portion 210 come the closer to the front face 110. The above-specified angle is determined within such a range that the top portion 210 avoids to abut against the front face 110. The space formed in the outer reinforcement 100 by providing the concave groove portion 115 makes it possible to set the top portion 210 of the inner reinforcement 200 at a small angle.

The inner reinforcement 200 of a single formed type is joined with its intermediate portion 215 being in face-to-face contact with the bottom face 117 of the concave groove portion 115. In this structure, the end portion of the inner skirt plate portion 213 rises from the bottom face 117 of the concave groove portion 115. It can be deemed as a substantially identical structure no matter whether only the intermediate portion 215 might be joined to the bottom face 117 or the end portions of the inner skirt plate portions 213 might be joined to the bottom face 117.

Figure 5:
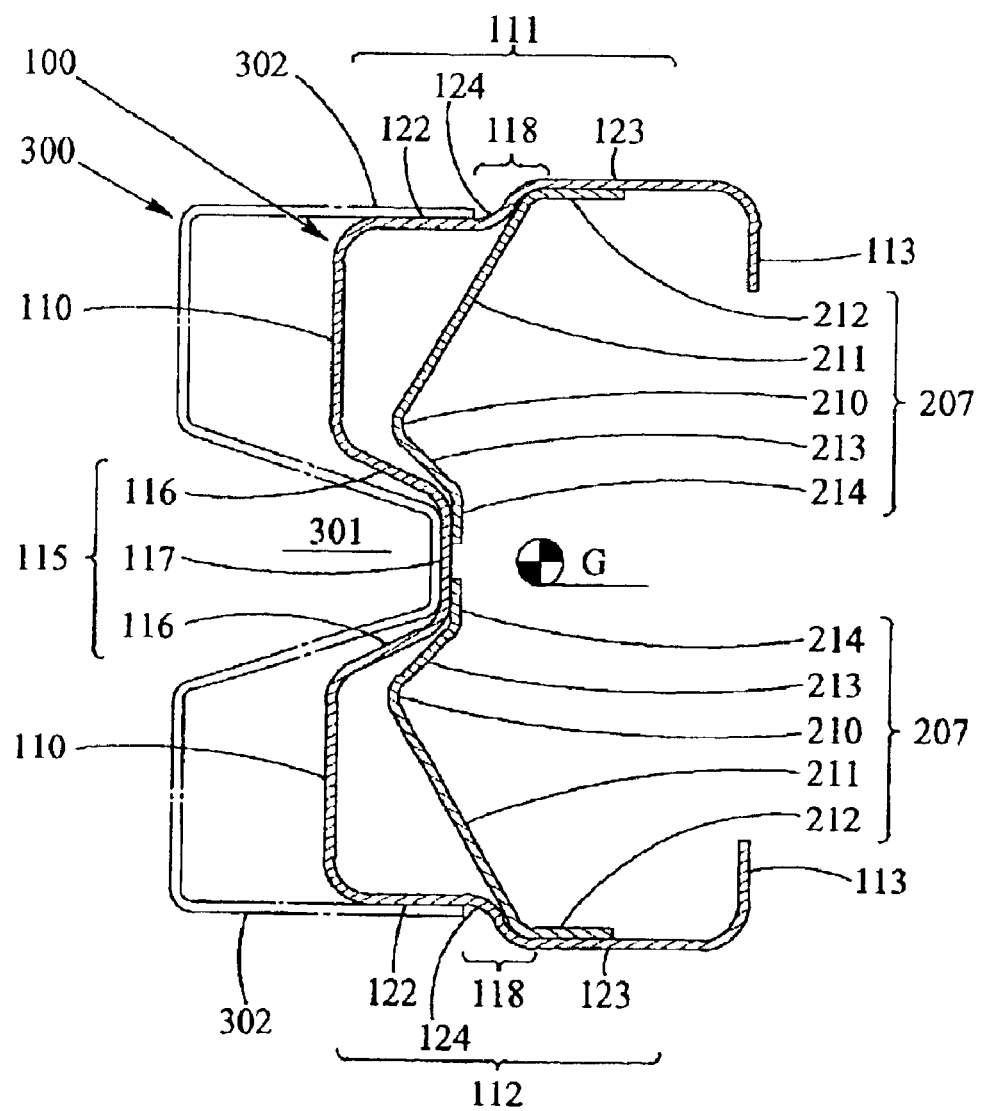
FIG. 5 is a longitudinal section showing a bumper reinforcement, in which a vertically separate type inner reinforcement is housed in an outer reinforcement having steps and a concave groove portion in a front face.

Therefore, the same actions and effects as those of the foregoing embodiment (as referred to FIG. 2) can be obtained, even if vertically separate inner reinforcements 207 are used, as shown in FIG. 5, by exemplifying the intermediate portion with inner contact face portions 214 folded and extended from the end portions of the inner skirt plate portions 213 of the individual inner reinforcements 207 and by joining the individual inner contact face portions 214 in face-to-face contact with the bottom face 117 of the concave groove portion 115.

Figure 6:
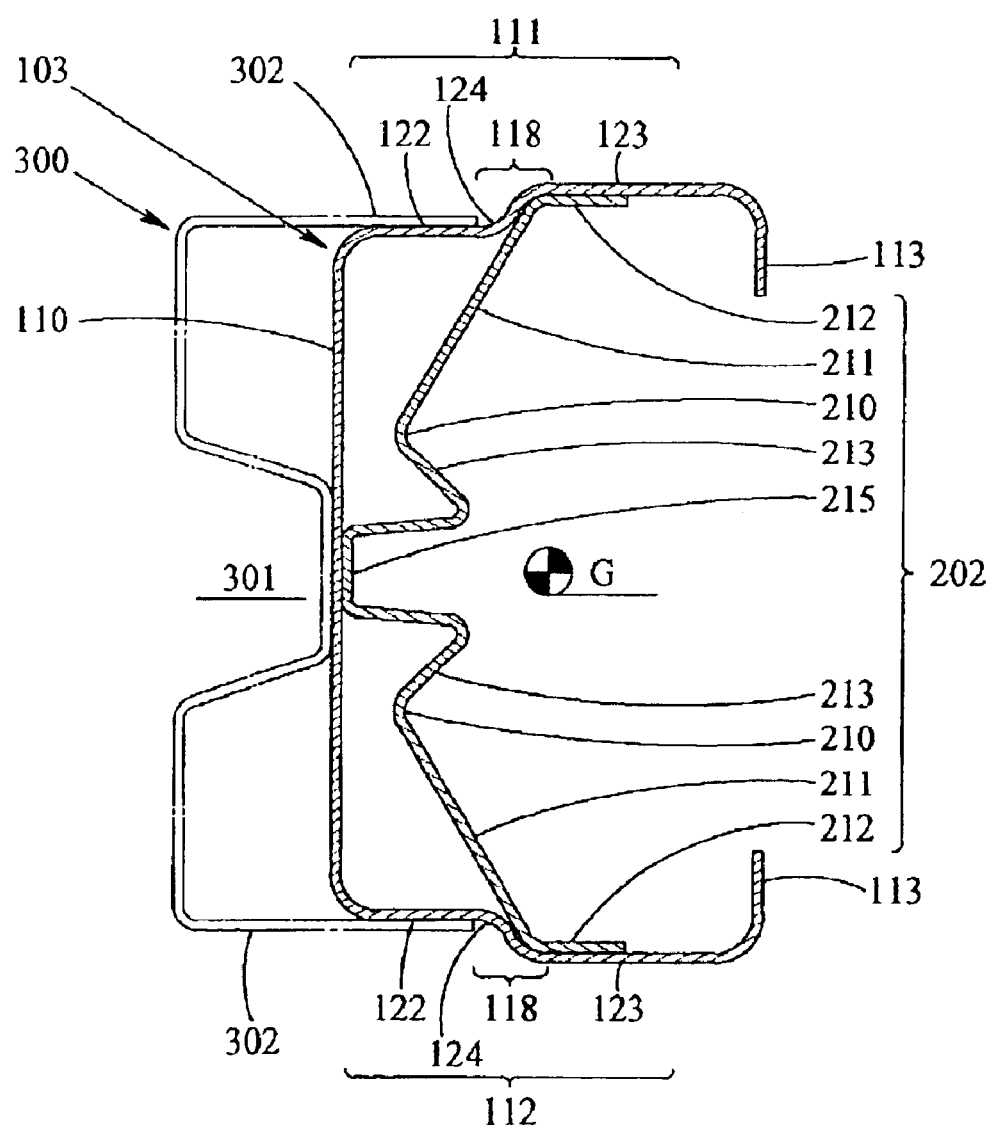
FIG. 6 is a longitudinal section showing a bumper reinforcement, in which a vertically single formed type inner reinforcement is housed in an outer reinforcement having only steps.
Figure 7:
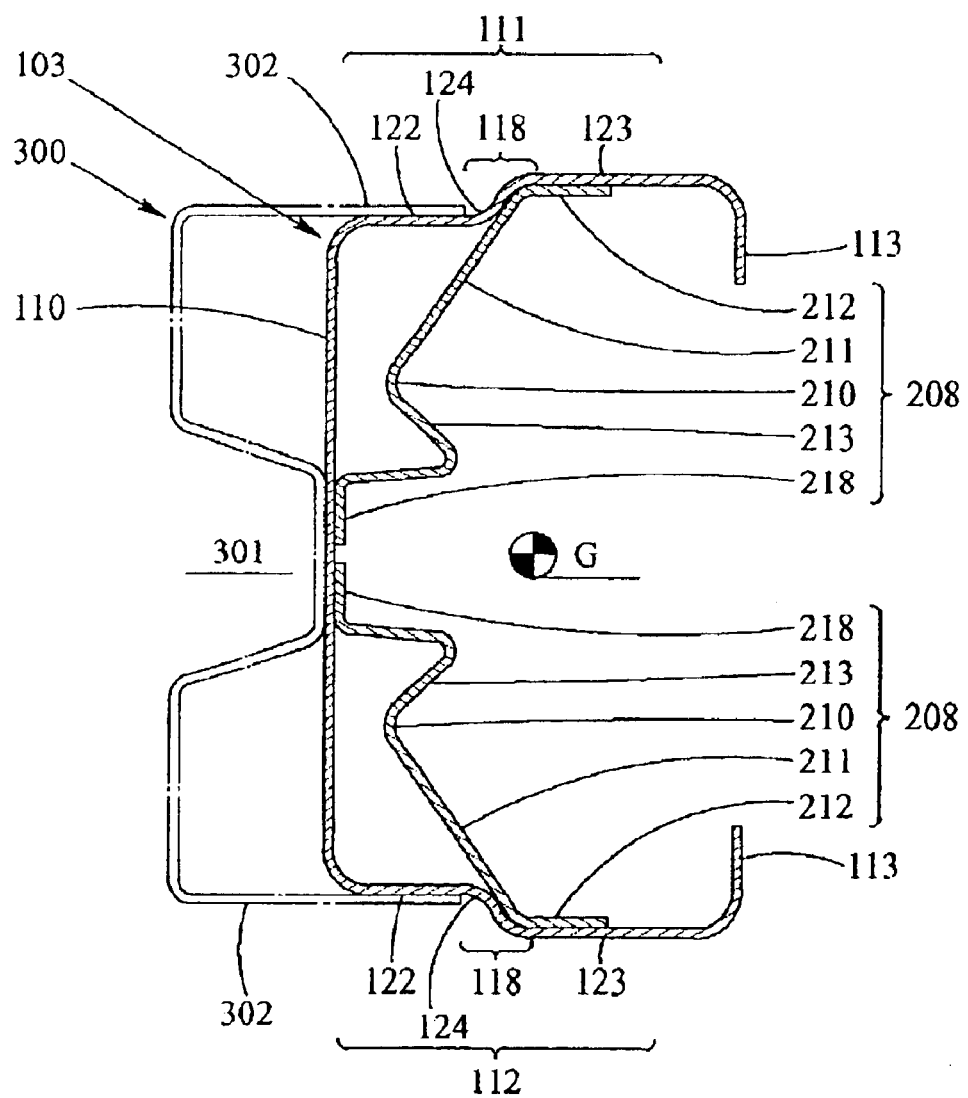
FIG. 7 is a longitudinal section showing a bumper reinforcement, in which a vertically separate type inner reinforcement is housed in an outer reinforcement having only steps.

In case the concave groove portion is not formed in the bumper reinforcement, moreover, the inner reinforcement is housed in the following manner. In an inner reinforcement 202 of a single formed type, as shown in FIG. 6, the intermediate portion 215 is formed to protrude toward the front face 110 of an outer reinforcement 103 at the end portions continuous from the inner skirt plate portions 213 and is joined in face-to-face contact to the inner side of the front face 110. In an inner reinforcements 208 of a separate type, on the other hand, the intermediate portion is exemplified, as shown in FIG. 7, by inner contact face portions 218 formed individually from the end portions of the inner skirt plate portions 213 of the inner reinforcements 208 and by joining the individual inner reinforcements 208 in face-to-face contact to the inner side of the front face 110.

Figure 8:
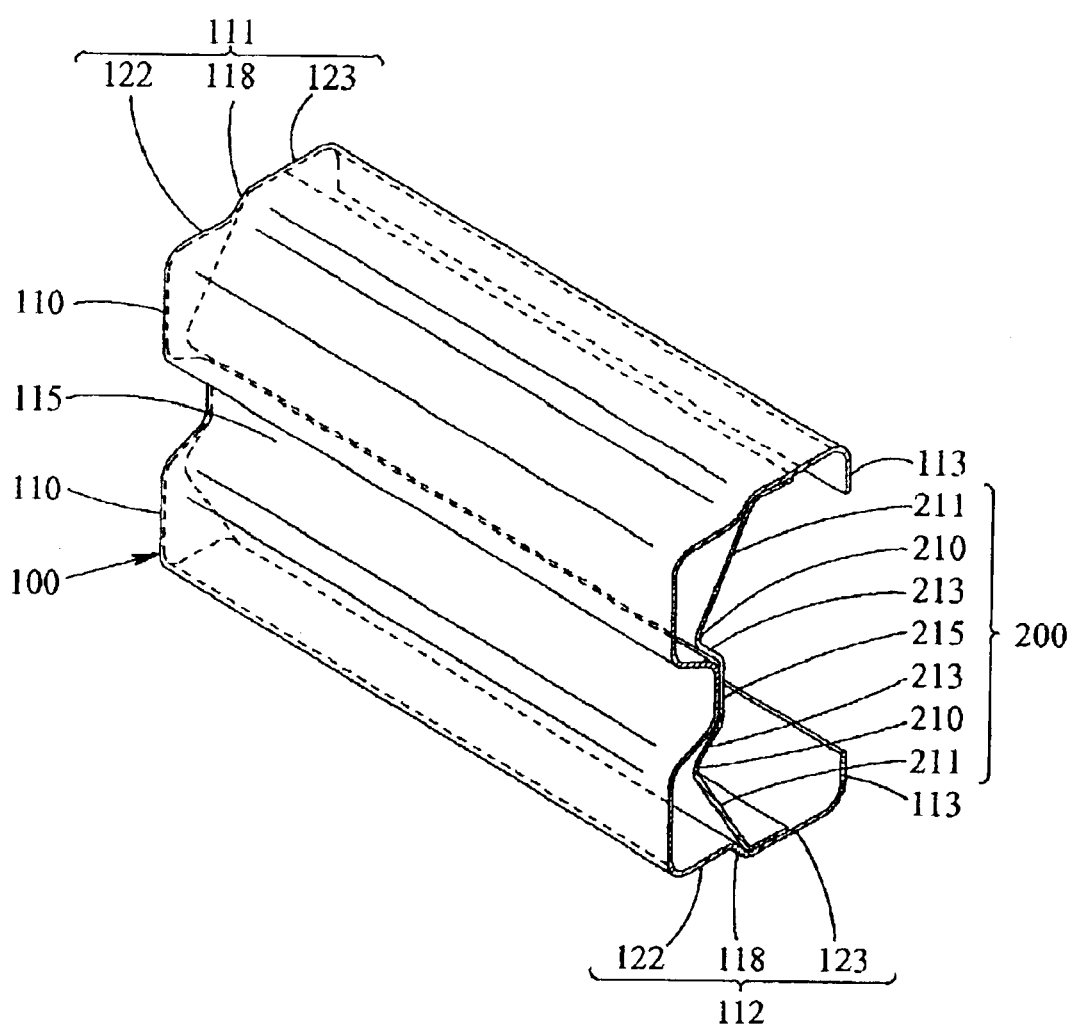
FIG. 8 is a perspective view showing a portion of a bumper reinforcement, in which an inner reinforcement is housed in an outer reinforcement of an equal length.
Figure 9:
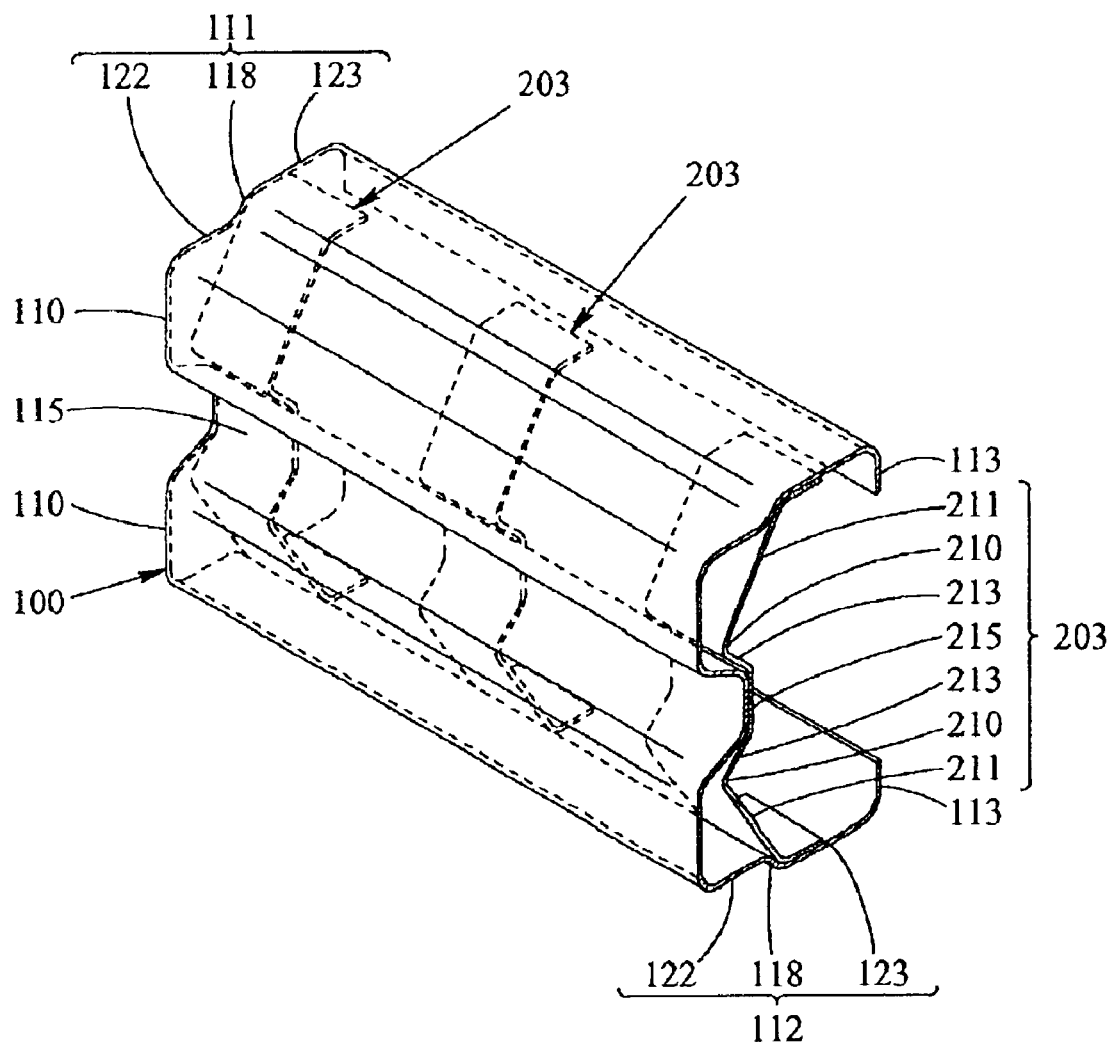
FIG. 9 is a perspective view showing a portion of a bumper reinforcement, in which a plurality of short inner reinforcements are housed in an outer reinforcement.

In the bumper reinforcement of the invention, it is sufficient that the front face, or its concave groove portion, and the upper face and the lower face are constructed to the inner reinforcement in the longitudinal section of the outer reinforcement. However, it does not matter whether or not the inner reinforcement is as long in the extending direction as the outer reinforcement. Therefore, the actions to prevent the upper face 111 and the lower face 112 from being opened by a collision can be exhibited, no matter whether the inner reinforcement 200 housed in the outer reinforcement 100 might have an equal length, as shown in FIG. 8, or a plurality of a short-lengthened inner reinforcement 203 might be housed intermittently in the extending direction of the outer reinforcement 100, as shown in FIG. 9.

In case the inner reinforcement 200 (of FIG. 8) used has the same length as that of the outer reinforcement 100, it prevents the upper face 111 and the lower face 112 from being opened, no matter what portion of the front face 110 the impact might be applied. Thus, it is possible to attain an effect to improve the structural strength and the shock absorbing performance of the outer reinforcement 100.

In case a plurality of the short-lengthened inner reinforcement 203 (of FIG. 9) are used, on the other hand, the adjoining inner reinforcements 203 can suppress, when arranged at a suitable spacing, the upper face 111 and the lower face 112 from being opened, to improve the structural strength and the shock absorbing performance of the outer reinforcement 100. Another advantage is that the material can be reduced by using such the short-lengthened inner reinforcements 203.

Figure 10:
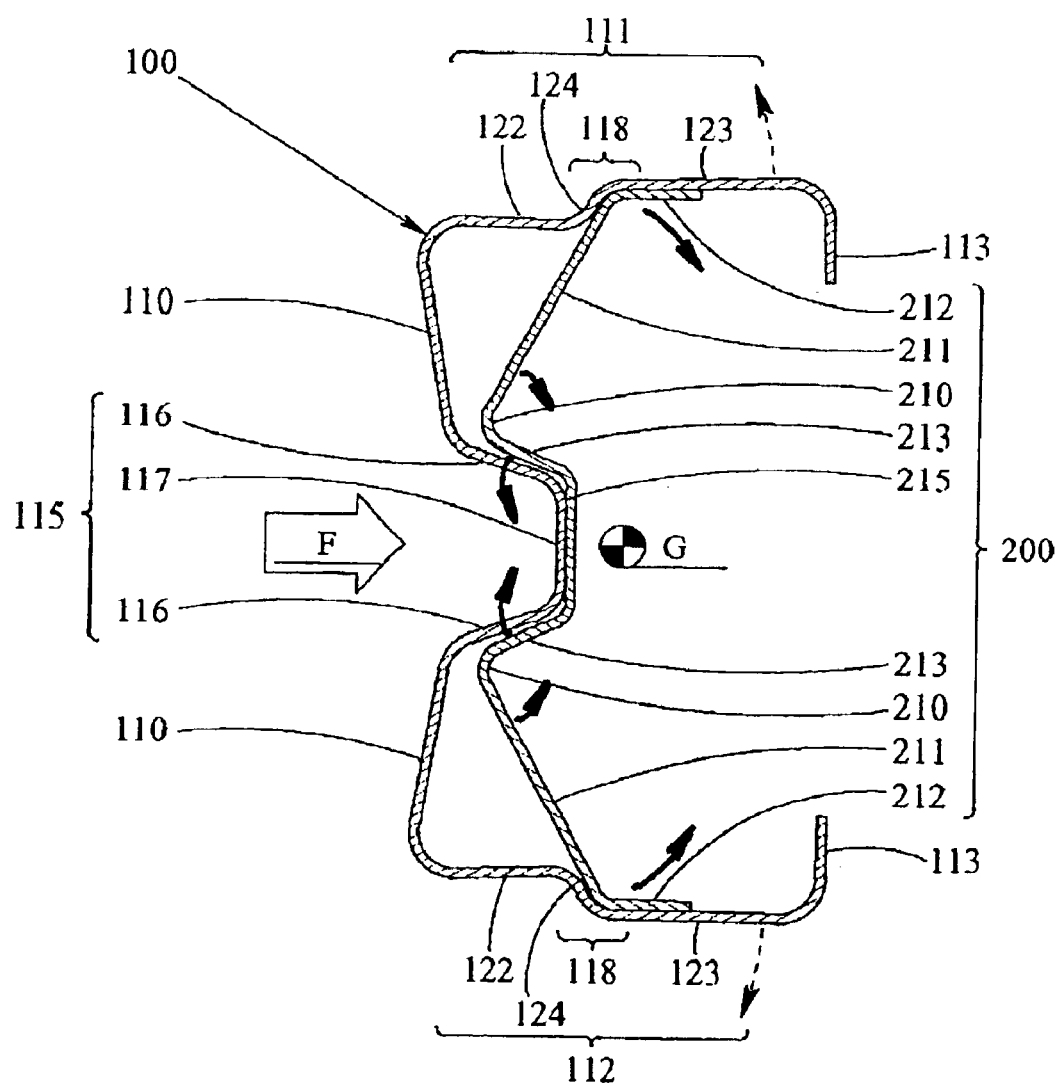
FIG. 10 is a longitudinal section similar to FIG. 2 but shows the bumper reinforcement is deformed when an impact F is applied from the front face.

The mode, in which the bumper reinforcement is deformed, will be described by using the outer reinforcement 100 shown in FIG. 2. When an impact F is applied to the front face 110, as shown in FIG. 10, the front face 110 is deformed concave around the concave groove portion 115 and is moved backward (or displaced rightward of FIG. 10). On the contrary, the upper face 111 and the lower face 112 of the outer reinforcement are compressed and are less moved backward than the front face 110 so that they are rather opened upward and downward (as referred to dotted arrows in the upward and downward directions of FIG. 10).

The inner skirt plate portions 213 and the outer skirt plate portions 211 of the inner reinforcement 200 follow the displacements of the concave groove portion 115 and the upper face 111 and the lower face 112, to which they are individually joined. As a result, the inner skirt plate portions 213 are inclined at first toward the side faces 116 of the concave groove portion 115. Then, the top portions 210 move forward relative to the inner skirt plate portions 213 and the outer skirt plate portions 211. As a result, the outer skirt plate portions 211 are inclined inward to prevent the upper face 111 and the lower face 112 from being opened.

Thus, according to the bumper reinforcement of the invention, in the inner reinforcement with which the front face or its concave groove portion, the upper face, and the lower face are constructed, the top portions formed by the inner skirt plate portion and the outer skirt plate portion being continuously folded prevents the upper face and the lower face of the outer reinforcement from being opened. In other words, so long as the inner reinforcement is kept active, the outer reinforcement and the inner reinforcement can be made so free in structure that ribs are formed at the upper face 111 and the lower face 112, for example.

Here will be described the actions of the ribs which are formed at the upper face 111 and the lower face 112 of the outer reinforcement. In the outer reinforcement 100 shown in FIG. 2, the paired step portions 118 are formed on a normal passing between the upper face 111 and the lower face 112 through the center G of gravity of the outer reinforcement 100, thereby to divide the upper face 111 and the lower face 112 into front side face portions 122 and rear side face portions 123. The step portions 118 enhance the rigidities of the upper face 111 and the lower face 112 thereby to suppress or prevent the buckling of the upper face 111 and the lower face 112.

Strictly, the outer reinforcement 100 of the open section structure has its center G of gravity slightly offset toward the front face 110. As a result, the step portions 118 are closer to the front face of the outer reinforcement 100 with respect to the length of the upper face 111 and the lower face 112 thereby to establish a relation, in which the rear side face portions 123 are longer than the front side face portions 122.

The step portions 118 are formed to direct step faces 124 toward the front face. The auxiliary reinforcement 300 can be easily positioned with respect to the outer reinforcement 100 by fitting the concave section portion 301 in the concave groove portion 115 of the outer reinforcement such that leg portions 302 of the auxiliary reinforcement is individually held in face-to-face contact with the front side face portions 122 while abutting the edges of the leg portions against the step faces 124 of the outer reinforcement. Moreover, the impact applied to the auxiliary reinforcement 300 can be borne by the step faces 124 through the leg portions 302 thereby to suppress the leg portions 302 from leaving the front side face portions 122.

Figure 11:
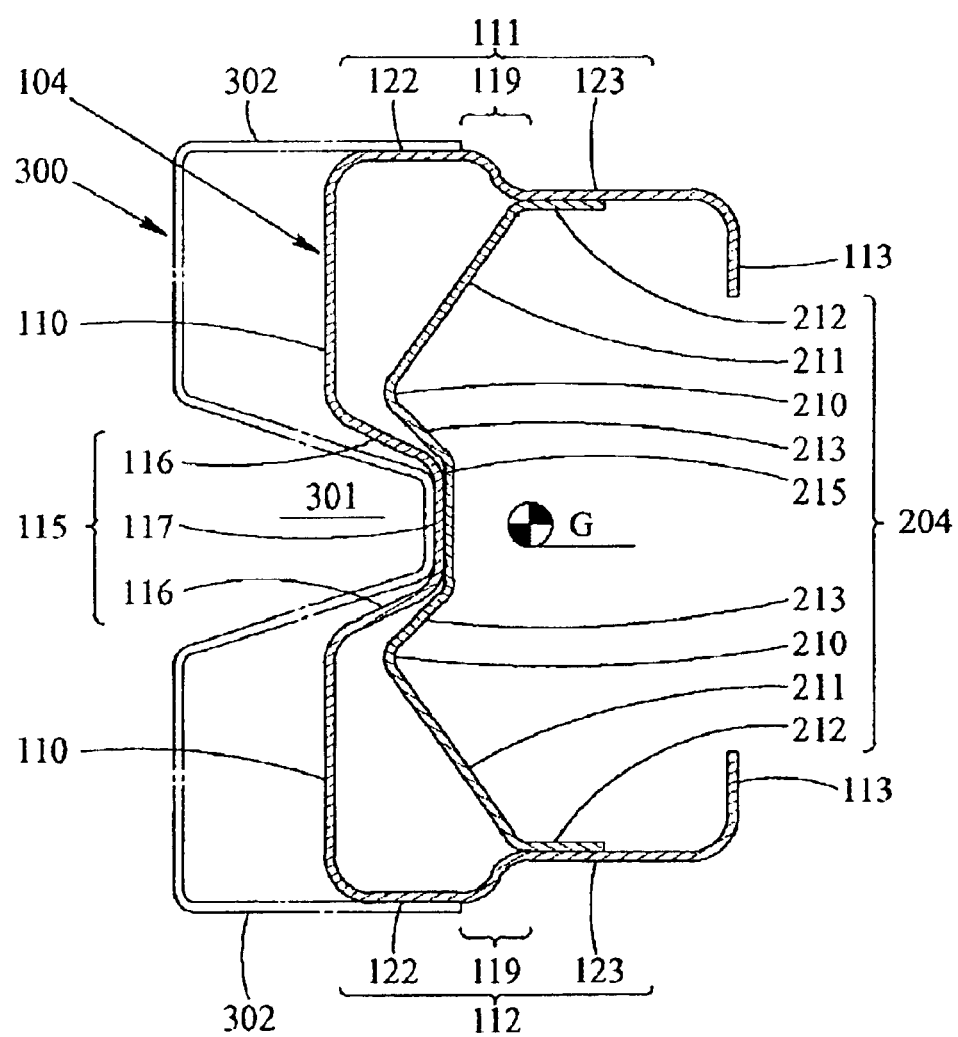
FIG. 11 is a longitudinal section of a bumper reinforcement of another embodiment, in which narrow steps are formed in an outer reinforcement.

In an outer reinforcement 104 shown in FIG. 11, the step portions 119 are formed as being the ribs. These step portions 119 are identical to the step portions 118 of the foregoing embodiment (as referred to FIG. 2) in the actions to enhance the rigidities of the upper face 111 and the lower face 112 of the outer reinforcement thereby to make their buckling hard, excepting they are different in the direction of inclination from the step portions 118. Moreover, the step portions 119 also have actions to position the auxiliary reinforcement 300 and an inner reinforcement 204 easily.

Figure 12:
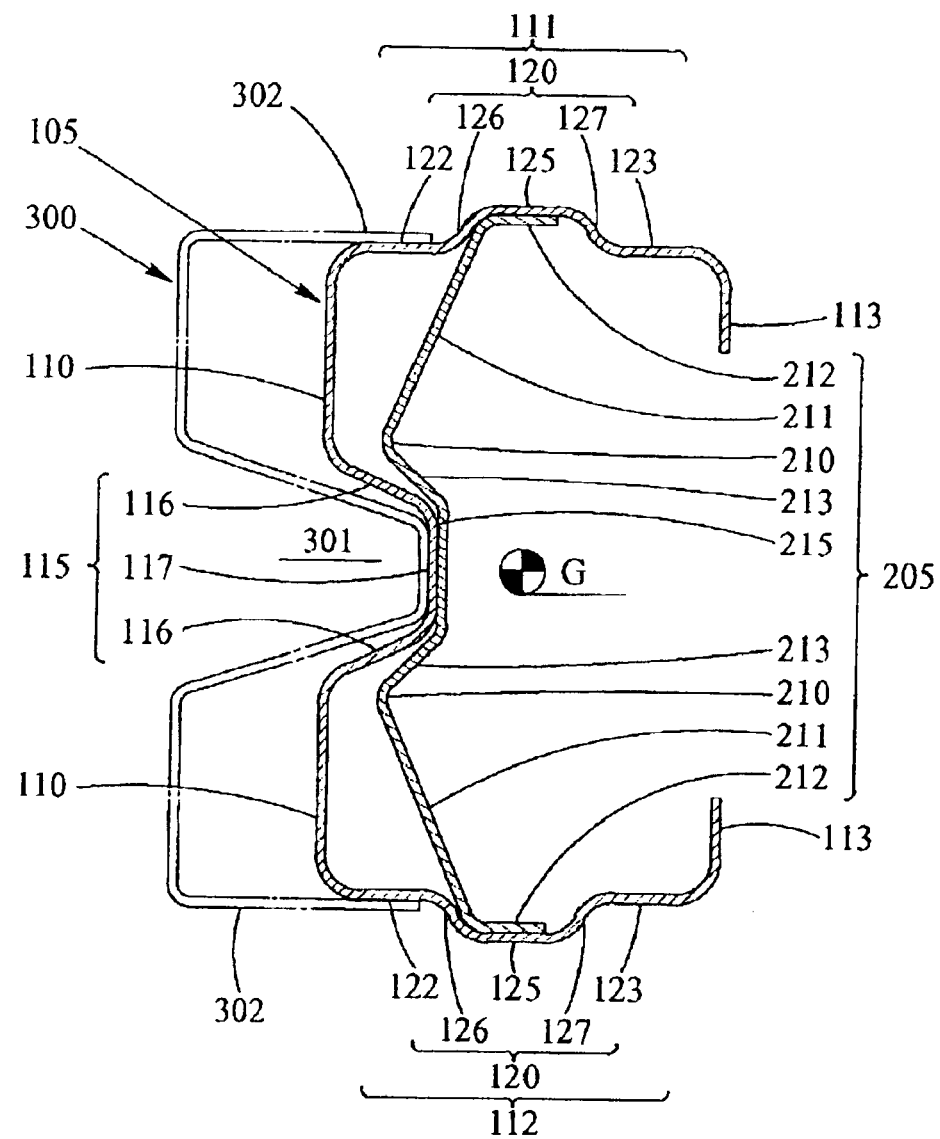
FIG. 12 is a longitudinal section of a bumper reinforcement of another embodiment, in which side convex bars are formed in an outer reinforcement.
Figure 13:
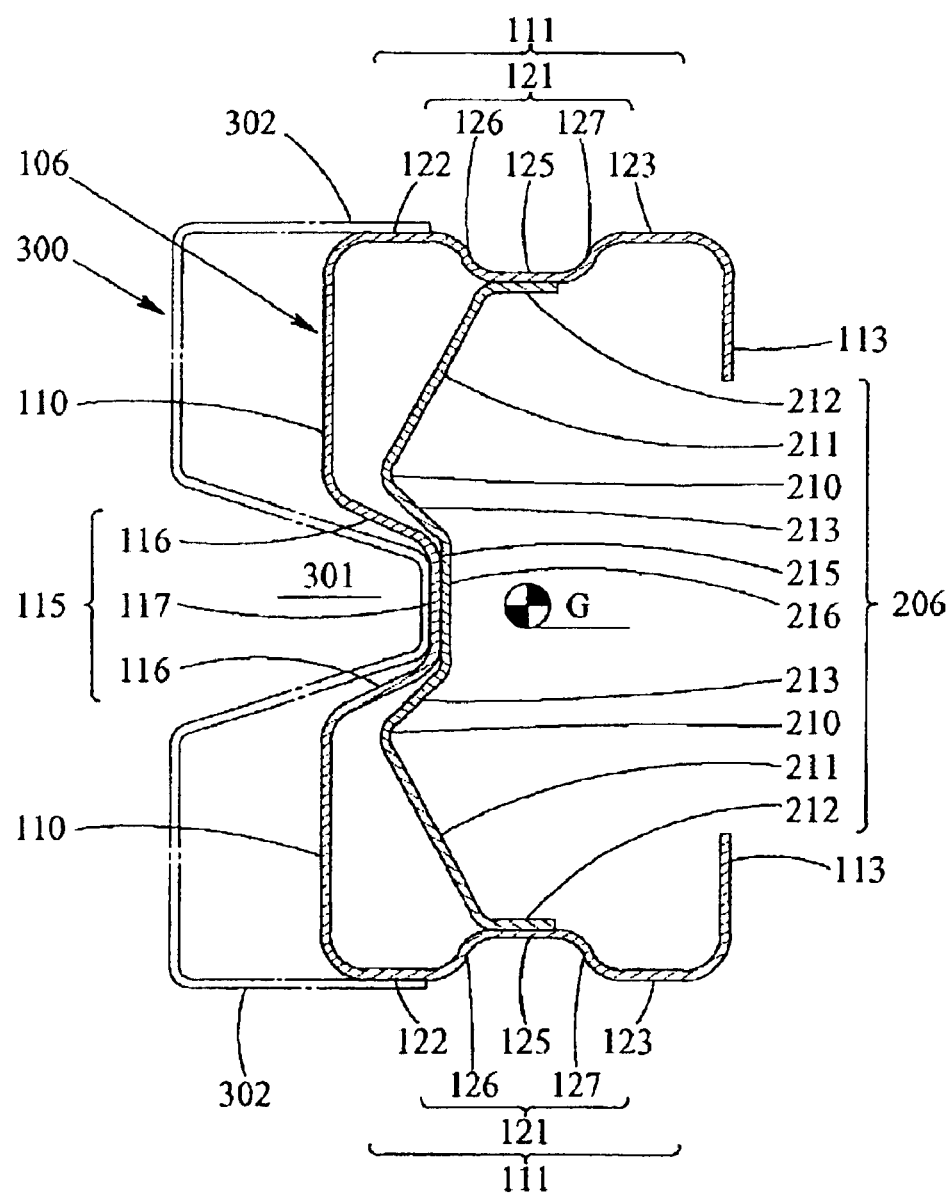
FIG. 13 is a longitudinal section of a bumper reinforcement of another embodiment, in which side concave grooves are formed in an outer reinforcement.

In addition, there can be exemplified an outer reinforcement 105, as shown in FIG. 12, having side convex bars 120 and an outer reinforcement 106, as shown in FIG. 13, having side concave grooves 121. The side convex bars 120 and the side concave grooves 121 are provided with intermediate faces 125 having a width in the depth direction, and the front side face portions 122 and the rear side face portions 123 are shorter than those of the foregoing embodiments (of FIG. 2 and FIG. 11). Therefore, the upper face 111 and the lower face 112 are more prevented from buckling.

Each of the side convex bars 120 has a structure, in which the steps are arranged to its front and back portions in one. Therefore, the front side face portions 122 and the rear side face portions 123 are arranged in a common plane as seen in FIG. 12, but may also be divided into different steps. The auxiliary reinforcement 300 can be positioned by bringing its leg portions 302 into abutment against the front step faces 126 of the side convex bar 120. An inner reinforcement 205 can also be positioned by fitting the outer contact face portions 212 thereof on the inner side of the side convex bars 120 of the outer reinforcement and by holding the same on rear step faces 127.

On the other hand, each of the side concave grooves 121 has a structure, in which the narrow steps are arranged to its front and back portions in one. Therefore, the front side face portions 122 and the rear side face portions 123 are arranged in a common plane as seen in FIG. 13, but may also be divided into different steps.

Figure 14:
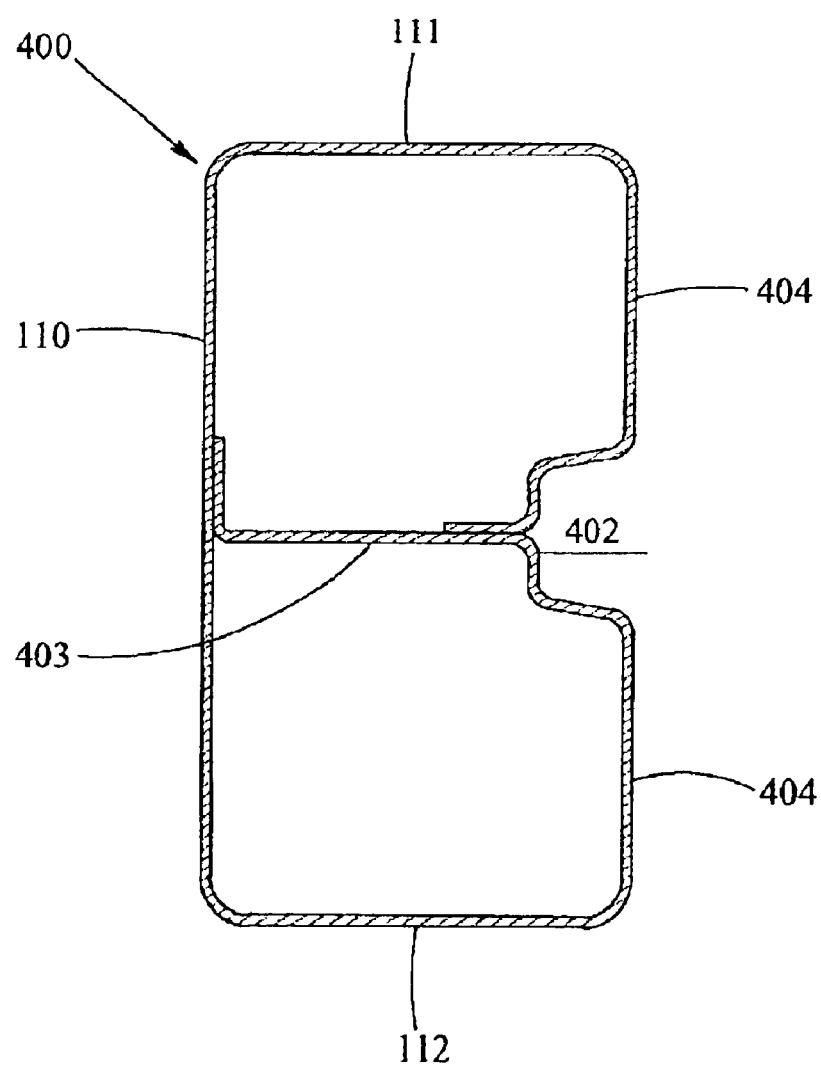
FIG. 14 is a longitudinal section of a bumper reinforcement of a closed section structure, in which a reinforcement rib is formed.
Figure 15:
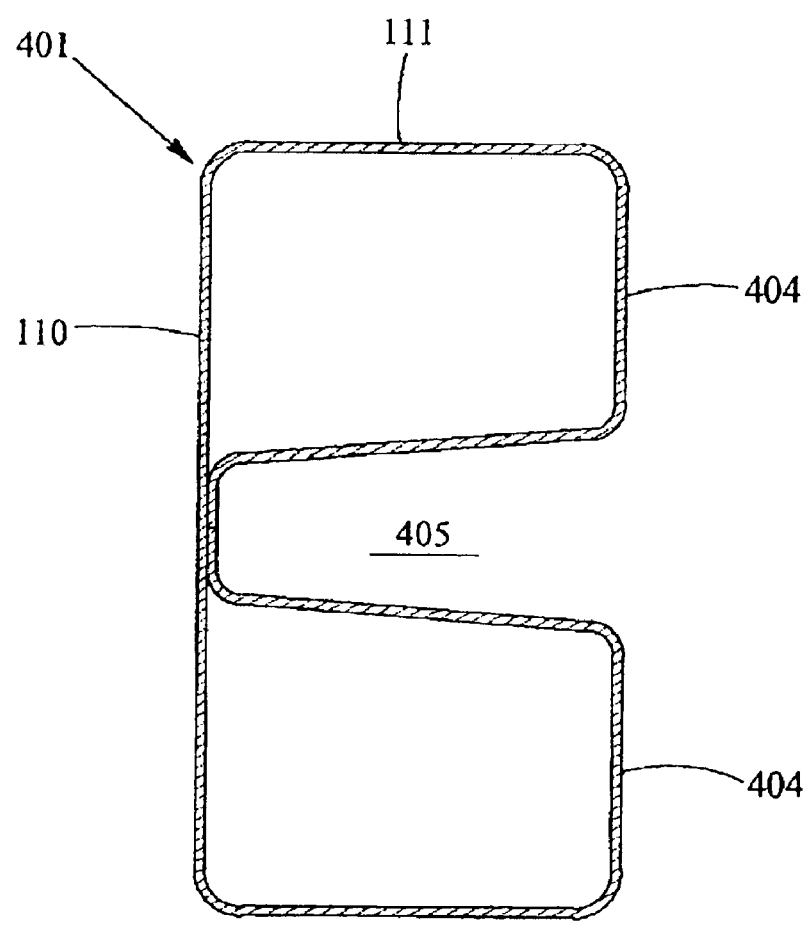
FIG. 15 is a longitudinal section of a bumper reinforcement of a closed section structure, in which a contact convex portion is formed.

The bumper reinforcement (of the embodiment, as referred to FIG. 2) according to the invention, in which the inner reinforcement 200 is housed in the outer reinforcement 100 of the open section structure, a bumper reinforcement 400 (of Comparison 1, as referred to FIG. 14) of the closed section structure, and another bumper reinforcement 401 (of Comparison 2, as referred to FIG. 15) were individually subjected to a pole collision test and a plane collision test by computer simulations, so that they might be compared from the aspect of the shock absorbing performance.

The embodiment used the bumper reinforcement (as referred to FIG. 2), in which the inner reinforcement 200 of a single formed type was housed in the outer reinforcement 10 of the open section structure, and the concave groove portion 115 was formed in the front face of the outer reinforcement 100. The inner reinforcement 200 and the outer reinforcement 100 prepared had a thickness of t=1.6 mm, a sectional contour of 120 mm (the upper and lower faces)×68 mm (the front and short rib faces), and a length in the extending direction (or the width as the bumper) of 780 mm, and, the concave groove portion 115 prepared had an opening width=30 mm, a bottom face width=20 mm, a depth=18 mm, and a total weight of the reinforcements=7.52 Kg.

Comparison 1 used the bumper reinforcement 400 (of FIG. 14) of the closed section structure, in which a back groove 402 was formed, and in which a reinforcing rib 403 is constructed between the back groove 402 and the front face 110. The bumper reinforcement 400 prepared had a thickness of t=1.7 mm, a sectional contour of 120 mm (the upper and the lower faces)×68 mm (the front and the back faces) and a length in the extending direction (or the width as the bumper) of 780 mm, and the back groove 402 prepared had an opening width=30 mm, a bottom face width=20 mm, a depth=15 mm, and a total weight of the reinforcement=7.54 Kg.

Comparison 2 used the bumper reinforcement 401 (of FIG. 15) of the closed section structure, in which a contact convex portion 405 was protruded from back faces 404 toward the front face 110. The bumper reinforcement 401 prepared had a thickness of t=1.6 mm, a sectional contour of 120 mm (the upper and the lower faces)×68 mm (the front and the back faces) and a length in the extending direction (or the width as the bumper) of 780 mm, and the contact convex portion 405 prepared had an opening width=30 mm, a contact convex bottom=24 mm, and a total weight of the reinforcement=7.57 Kg.

First of all, the embodiment and Comparisons 1 and 2 were subjected to the pole collision tests. Specifically, the impact (or load) F, under conditions with the vehicle weight=1,300 Kg and at a velocity=about 8.0 Km/h, was partially applied to the front faces of each bumper reinforcement. The calculations were made on the displacements (mm) of the front face displacing backward by impact F applied, and the loads (KN) which could be absorbed at every steps of said displacements. Because of the pole collision, it is considered that the deformations of the bumper reinforcement were limited to partial ones, and that the difference in the shock absorbing performance appeared mainly in the section structure thereof.

Figure 16:
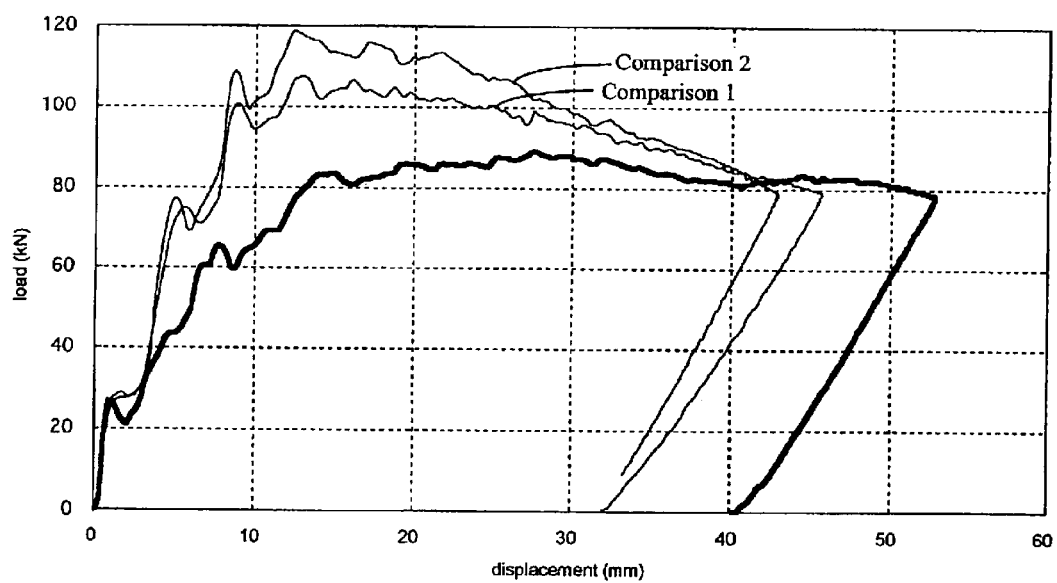
FIG. 16 is a graph plotting a load-displacement curve of a pole collision test result.

The test results are concluded in a graph of load-displacement curves of FIG. 16. It is apparent from this graph that Comparisons 1 and 2 of the closed section structure exhibited higher loads at a displacement up to 40 mm than that of the embodiment. At the instant when the displacement of 40 mm was reached, the buckling occurred on the comparisons so that the shock could not be absorbed any more.

In the embodiment of the invention, on the contrary, a substantially constant shock absorption was exhibited from the displacement of 20 mm, and a stable shock absorbing performance was exhibited up to the displacement of 50 mm. The total load absorption to be absorbed by the bumper reinforcement is proportional to the area of the graph. It is, therefore, found that the embodiment and Comparisons 1 and 2 exhibit shock absorbing performances of little difference in the total load absorption.

Next, the embodiment and Comparisons 1 and 2 were subjected to the plane collision test. Specifically, the impact (or load) F, under conditions with the vehicle weight=1,300 Kg and at a velocity=about 8.0 Km/h, was wholly applied to the front faces of each bumper reinforcement. The calculations were made on the displacements (mm) of the front face displacing backward by impact F applied, and the loads (KN) which could be absorbed at every steps of said displacements. Because of the plane collision, the deformation covered a wide range in the extending direction of the bumper reinforcement. It was, therefore, possible to measure not only the shock absorbing performance based on the sectional structure but also the whole shock absorbing performance of the bumper reinforcement.

Figure 17:
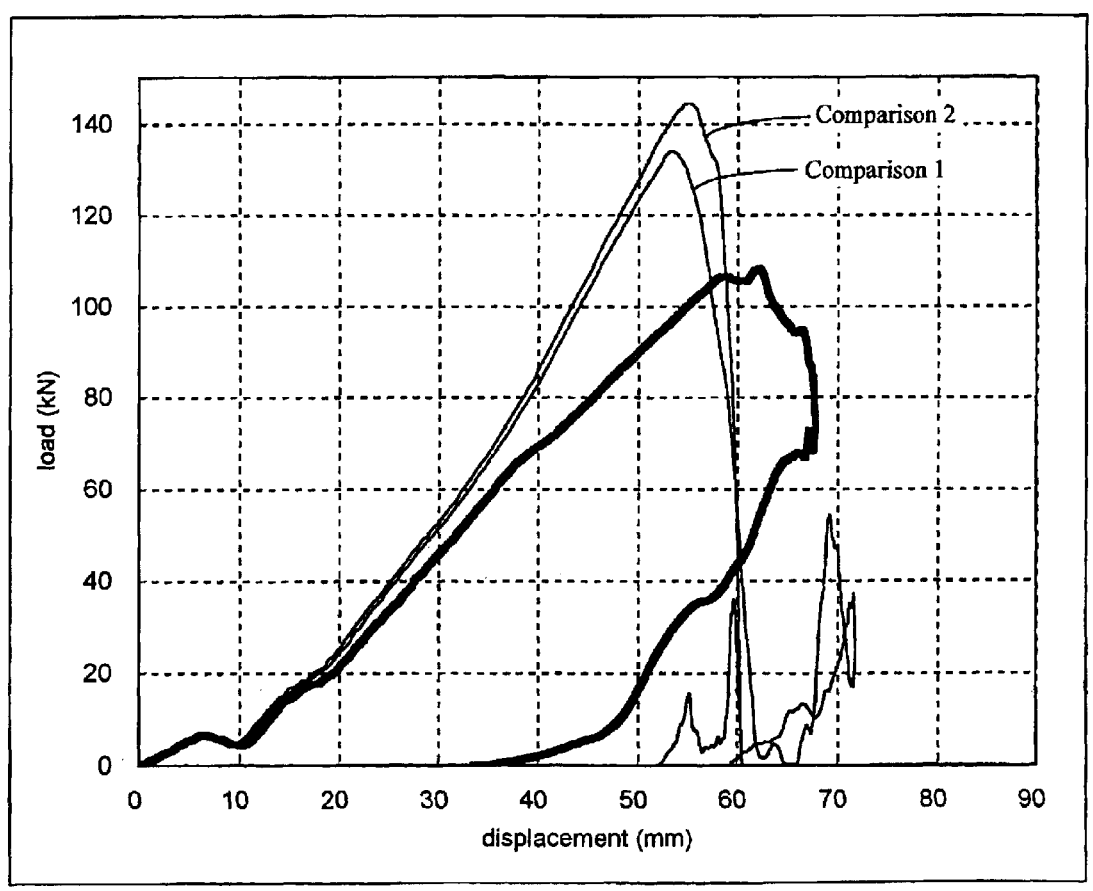
FIG. 17 is a graph plotting a load-displacement curve of a plane collision test result.

The test results are concluded in a graph of load-displacement curves in FIG. 17. It is apparent from this graph that Comparisons 1 and 2 of the closed section structure are enabled to exhibit higher loads up to a displacement of 50 mm than that of the case of the pole collision by the achievements of the back groove (of Comparison 1) and the contact convex portion (of Comparison 2). At and after the displacement of 50 mm, however, the buckling occurred on the comparisons to lower the shock absorbing performance drastically. On the contrary, the embodiment of the invention exhibits the shock absorbing performance up to the displacement of 60 mm and lowers the absorbable load relatively gently at and after the displacement of 60 mm.

Thus, the bumper reinforcement having the open section structure according to the invention does not always exhibit the characteristics identical to those of the bumper reinforcement of the closed section structure in the shock absorbing performance. However, it has been confirmed that the invention has an effect to raise the shock absorbing performance of the bumper reinforcement having the open section structure, as generally been recognized to be inferior in the performance of the bumper reinforcement having the closed section structure in the related arts, to a substantially equal level.

Moreover, it has been confirmed in the aforementioned individual texts that the upper face and the lower face of the outer reinforcement are not opened unlike those of the bumper reinforcement having the open section structure in the related art. This apparently reveals that the inner reinforcement of the invention prevents the opening of the upper and the lower faces, effectively. From the above, therefore, it shows that the bumper reinforcement having the open section structure of the invention is not inferior only in the shock absorbing performance but also in structural strength, as shown in the load-displacement curves, to the performance of the bumper reinforcement having the closed section structure.

According to the invention, it makes to provide the bumper reinforcement having the open section structure, which is not inferior to the bumper reinforcement having the closed section structure in the structural strength and the shock absorbing performance. That is, there can be enjoyed the advantages of the open section structure that the material can be easily spared to reduce the weight and that the back face of the reinforcement is opened to enhance the degree of freedom for mounting the structure on the vehicle frame.

The inner reinforcement is enabled to enhance the rigidities of the front face, the upper face, and the lower face, by fixing them with the contact face portions formed at the individual end portions of the individual skirt plate portions being in face-to-face contact with the front face, the upper face, and the lower face of the outer reinforcement. Especially, in the bumper reinforcement having the concave groove portion in the front face, the rigidity of the front face usually the impact applied is enhanced to a higher level by that the intermediate portion of the inner reinforcement is formed in a similar shape to the concave groove portion and fixed in face-to-face contact to the bottom face of the concave groove portion. In the construction having the concave groove portion and the intermediate portion joined to each other, moreover, it is further advantageous to position the inner reinforcement with respect to the outer reinforcement easier.

The ribs formed at the upper face and the lower face can restrain or prevent the buckling occurred at the upper face and the lower face and can improve the structural strength and the shock absorbing performance without increasing the thickness of the material. In addition, the ribs are active to guide the positioning of the inner reinforcement housed in the outer reinforcement.

What is claimed is:

1. A bumper reinforcement comprising an outer reinforcement and an inner reinforcement housed in the outer reinforcement, wherein the outer reinforcement is made of a metal channel member of an open section having a front face, an upper face, and a lower face;

the inner reinforcement is made of a metal angle member;

the metal angle member has a pair of skirt plate portions folded from an intermediate portion;

the intermediate portion is joined to the front face of the outer reinforcement; and a pair of outer contact face portions that are end portions of the outer skirt plate portions are joined individually to the upper face and the lower face of the outer reinforcement.

2. A bumper reinforcement according to claim 1, wherein the inner reinforcement includes;

top portions fanned at the individual skirt plate portions to protrude toward the front face of the outer reinforcement, thereby to divide each of the skirt plate portions into an inner skirt plate portion and an outer skirt plate portion, the intermediate portion formed of the end portions of the inner skirt plate portions to join with the front face of the outer reinforcement, and the outer contact face portions that am end portions of the outer skirt plate portions individually to join with the upper face and the lower face of the outer reinforcement.

3. A bumper reinforcement according to claim 1, wherein the outer reinforcement includes;

a concave groove portion extending in direction of the length formed in the front face, the inner reinforcement includes;

the intermediate portion to join with the concave groove portion, and the outer contact face portions that are end portions of the outer skirt plate portions individually to join with the upper face and the lower face of the outer reinforcement.

4. A bumper reinforcement according to claim 1, wherein the outer reinforcement includes;

a concave groove portion extending in direction of the length formed in the front, the inner reinforcement includes;

the intermediate portion to join in face-to-face contact with a back face of a bottom face of the concave groove portion, and the outer contact face portions that are end portions of the outer skirt plate portions individually to join with the upper face and the lower face of the outer reinforcement.

5. A bumper reinforcement comprising an outer reinforcement and an inner reinforcement housed in the outer reinforcement, wherein the outer reinforcement is made of a channel member of an open section having a front face, an upper face, and a lower face;

the inner reinforcement is made of an angle member;

the angle member has a pair of skirt plate portions folded from an intermediate portion;

the intermediate portion is joined to the front face of the outer reinforcement;

a pair of outer contact face portions that are end portions of the outer skirt plate portions are joined individually to the upper face and the lower face of the outer reinforcement;

the outer reinforcement includes;

a concave groove portion extending in direction of the length formed in the front face, a pair of steps extending in direction of the length individually formed in the upper face and the lower face, thereby to divide the upper face and the lower face individually into a pair of front side face portions and a pair of rear side face portions, a distance between the paired front side faces is narrower than that of the paired rear side face portions, the inner reinforcement includes;

the intermediate portion to join with a back face of a bottom face of the concave groove portion, and the outer contact face portions that are end portions of the outer skirt plate portions individually to join with the upper face and the lower face of the outer reinforcement by being installed to the steps.

6. A bumper reinforcement comprising an outer reinforcement and an inner reinforcement housed in the outer reinforcement, wherein the outer reinforcement is made of a channel member of an open section having a front face, an upper face, and a lower face;

the inner reinforcement is made of an angle member;

the angle member has a pair of skirt plate portions folded from an intermediate portion;

the intermediate portion is joined to the front face of the outer reinforcement; a pair of outer contact face portions that are end portions of the outer skirt plate portions are joined individually to the upper face and the lower face of the outer reinforcement;

the outer reinforcement includes;

a concave groove portion extending in direction of the length formed in the front face, a pair of steps extending in direction of the length individually formed in the upper face and the lower face, thereby to divide the upper face and the lower face individually into a pair of front side face portions and a pair of rear side face portions, a distance between the paired front side faces is wider than that of the paired rear side face portions, the inner reinforcement includes;

the intermediate portion to join with a back face of a bottom face of the concave groove portion, and the outer contact face portions that are end portions of the outer skirt plate portions individually to join with the upper face and the lower face of the outer reinforcement by being installed to the steps.

* * * * *